United States Patent
Landes et al.

(10) Patent No.: US 11,548,537 B2
(45) Date of Patent: Jan. 10, 2023

(54) CENTERING APPARATUS FOR HOPPER CAR DOORS

(71) Applicant: Herzog Railroad Services, Inc., St. Joseph, MO (US)

(72) Inventors: Nathan A. Landes, St. Joseph, MO (US); Stephen Bedingfield, Savannah, MO (US); Michael Staihr, Raymore, MO (US); David Smith, Raymore, MO (US); Jacob D. Herzog, St. Joseph, MO (US); Tony Shirk, Clarksdale, MO (US); Daniel T. Marshall, Leavenworth, KS (US)

(73) Assignee: Herzog Railroad Services, Inc., St. Joseph, MO (US)

( * ) Notice: Subject to any disclaimer, the term of this patent is extended or adjusted under 35 U.S.C. 154(b) by 0 days.

(21) Appl. No.: 16/992,884

(22) Filed: Aug. 13, 2020

(65) Prior Publication Data
US 2021/0046956 A1    Feb. 18, 2021

Related U.S. Application Data

(60) Provisional application No. 62/887,052, filed on Aug. 15, 2019.

(51) Int. Cl.
*F15B 15/14* (2006.01)
*B61D 7/28* (2006.01)
(Continued)

(52) U.S. Cl.
CPC ............. *B61D 7/28* (2013.01); *B61D 7/02* (2013.01); *B61D 7/18* (2013.01); *E05F 1/105* (2013.01);
(Continued)

(58) Field of Classification Search
CPC .... F15B 15/1409; F15B 15/1428; B61D 7/28; E05Y 2900/51
See application file for complete search history.

(56) References Cited

U.S. PATENT DOCUMENTS

| 3,727,523 A | 4/1973 | Gulick |
| 3,848,885 A | 11/1974 | Hefren |

(Continued)

FOREIGN PATENT DOCUMENTS

| CA | 1039114 A | 9/1978 |
| CN | 202545389 U | * 11/2012 |
| CN | 204161372 U | 2/2015 |

*Primary Examiner* — Thomas E Lazo
(74) *Attorney, Agent, or Firm* — Avek IP, LLC; Kent R. Erickson

(57) ABSTRACT

A centering apparatus for bi-directionally pivotable hopper doors. The apparatus is coupled between a frame of a hopper car and a bell crank of a hopper door. The apparatus includes a housing with a piston extending from one end. An end of the piston within the housing includes a piston head. A pair of coil springs are disposed within the housing on opposite sides of the piston head and counteract one another to bias the piston head toward the center of the housing and thus bias the hopper door toward a closed state. In a second configuration the apparatus includes a double-acting actuator with a pair of independent piston assemblies. An actuation system coupled to the actuator maintains the actuator and an associated hopper door in a closed position in a normal state and returns the hopper door to the closed position upon a failure in the system.

10 Claims, 10 Drawing Sheets

(51) Int. Cl.
  *B61D 7/18*   (2006.01)
  *E05F 1/10*   (2006.01)
  *E05F 15/53*  (2015.01)
  *E05F 1/14*   (2006.01)
  *F15B 15/06*  (2006.01)
  *F15B 11/20*  (2006.01)
  *B61D 7/02*   (2006.01)

(52) U.S. Cl.
  CPC ............... *E05F 1/14* (2013.01); *E05F 15/53* (2015.01); *F15B 11/20* (2013.01); *F15B 15/06* (2013.01); *F15B 15/1476* (2013.01); *E05Y 2201/41* (2013.01); *E05Y 2201/422* (2013.01); *E05Y 2201/474* (2013.01); *E05Y 2900/51* (2013.01); *F15B 2211/41572* (2013.01); *F15B 2211/7053* (2013.01); *F15B 2211/71* (2013.01)

(56) References Cited

U.S. PATENT DOCUMENTS

| | | |
|---|---|---|
| 3,872,796 A | 3/1975 | Adler et al. |
| 3,910,635 A | 10/1975 | Holland |
| 3,931,768 A * | 1/1976 | Price ................ B61D 7/18 105/288 |
| 4,366,757 A | 1/1983 | Funk |
| 4,542,701 A * | 9/1985 | Fischer ................ B61D 7/28 91/461 |
| 5,161,822 A | 11/1992 | Lund |
| 5,163,372 A | 11/1992 | Galvan et al. |
| 5,261,333 A | 11/1993 | Miller |
| 5,359,942 A * | 11/1994 | Ward ................ B61D 7/30 105/241.2 |
| 5,606,916 A * | 3/1997 | Murray ................ B61D 7/28 105/280 |
| 6,067,912 A | 5/2000 | Miller |
| 7,707,944 B2 | 5/2010 | Bounds |
| 8,596,203 B2 | 12/2013 | Forbes et al. |
| 8,915,193 B2 | 12/2014 | Bis et al. |
| 8,915,194 B2 | 12/2014 | Creighton et al. |
| 10,501,096 B2 | 12/2019 | Chen et al. |
| 2006/0185553 A1 | 8/2006 | Taylor |
| 2010/0270848 A1* | 10/2010 | Heider ................ B60P 1/56 298/27 |
| 2013/0019776 A1* | 1/2013 | Wang ................ B61D 7/28 105/240 |
| 2015/0101216 A1 | 4/2015 | Kerr et al. |
| 2018/0281824 A1* | 10/2018 | Reitz ................ B61D 7/08 |

\* cited by examiner

CENTERING APPARATUS FOR HOPPER CAR DOORS

CROSS-REFERENCE TO RELATED APPLICATIONS

This application claims the benefit of U.S. Provisional Patent Application No. 62/887,052, filed Aug. 15, 2019 the disclosure of which is hereby incorporated herein in its entirety by reference.

BACKGROUND

Hopper cars are common in the rail industry and come with a variety of discharge-door styles that may be configured for a particular type of material carried by the hopper car and/or a dumping procedure to be used for removing the material from the hopper car. One style of hopper door, referred to herein as a transverse-pivot discharge door, enables discharging or dumping of material from within the hopper to an outboard side of the underlying rails or to an inboard position between the rails. One exemplary embodiment of a transverse-pivot discharge door is described in U.S. Pat. No. 5,606,916 to Murray.

Typically, a transverse-pivot discharge door is positioned beneath a longitudinally extending, generally rectangular discharge opening in a bottom surface of a hopper in a hopper car. The hopper door includes a top surface that is sized and configured to obstruct a flow of material from the hopper through the discharge opening. Side surfaces of the hopper door extend downwardly away from opposing transverse edges of the top surface. The discharge door may be pivoted about a longitudinally extending axis to move the top surface transversely and at least partially out of alignment with the discharge opening to allow material to flow through the discharge opening and into contact with a respective one of the side surfaces. The side surface directs the material transversely toward the outboard side of underlying rails on which the hopper car is positioned. The hopper door can be pivoted in an opposite direction to release and direct the material to the inboard area beneath the hopper car and between the rails.

A system of actuators, such as hydraulic actuators, is coupled to the discharge door to provide pivotal movement thereof. The actuators may be actuated to pivot the hopper door toward the outboard or inboard sides and between open (or partially open) and closed positions.

Proper detection and tracking of the open/closed state of the discharge door is important for determining an amount of material that has been discharged as well as for ensuring the discharge door is closed when such a state is desired. The position of the hopper door may be detected by the actuating system, such as by detecting positions of pistons of the actuators although such is often difficult to accurately accomplish. Further, in the instance of a failure in the actuation system the system may not provide a proper or reliable fail-safe mechanism to ensure closure of the discharge door.

Sensors may be associated with the hopper door to detect open/closed states thereof. However, sensors in such systems suffer from faulty readings, lost calibration, and damage due to the harsh and dirty conditions to which they are exposed. These sensors are thus often not sufficiently reliable for detecting and ensuring proper closure of the hopper door.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes a centering apparatus for pivoting discharge doors of a hopper car.

In one embodiment, the centering apparatus comprises a dual-acting spring cylinder configured to enable pivotable movement of a discharge door between closed and open states by an actuation system while also aiding and/or providing return movement of the discharge door to the closed state upon de-energizing the actuation system. The spring cylinder includes an elongate housing with an extensible centering shaft extending from one end thereof. A proximate end of the centering shaft, positioned within the housing, is coupled to a centerplate that is dimensioned to fit and move longitudinally within the housing with the centering shaft. A first coil spring is disposed between the centerplate and an endplate. A second coil spring is disposed between an opposite side of the centerplate and a washer plate that is affixed at an opposite end of the housing and which encircles the centering shaft. The first and second coil springs counteract one another to urge or bias the centerplate toward the center of the housing and thus urge or bias the proximate end of the centering shaft toward a home position within the housing with an opposite distal end extending from the housing.

In use the centering apparatus is coupled between a pivotable hopper door, such as a transverse-pivot discharge door, and a frame or other static member of a hopper car. The actuation system is energized to pivot the hopper door in a first direction which compresses the first spring between the center plate and the end plate and may extend the second spring. Upon de-energizing or relaxing of the actuation system or reversal of the actuation system, the compressed first spring acts to move or bias the centerplate back toward the center position within the housing and thus to move the centering shaft to the home position. Where the second spring is extended, the second spring may also retract to aid movement of the centerplate toward the center position within the housing.

When the actuation system is energized to pivot the hopper door in the opposite second direction, the second spring is compressed between the centerplate and the washer plate and the first spring may be extended. Upon de-energizing the actuation system, the second spring acts to move or bias the centerplate back toward the center position within the housing. The first spring may also retract to aid such movements.

In another embodiment, the centering apparatus comprises a double-acting actuator. The double-acting actuator includes a cylinder with a transverse, central wall located along its length and a pair of extensible pistons disposed on either longitudinal side thereof. The pistons are independently extensible from their respective ends of the cylinder to pivot a hopper door transversely inward or outward. An actuation system, such as a hydraulic system associated with the double-acting actuator is configured and coupled to the double-acting actuator such that a normal state of the double-acting actuator pivots the hopper door to the closed position. As such, the double-acting actuator reliably places the hopper door in the closed position without need to sense or detect such positions and can reliably do so upon occurrence of failures within the associated actuation system, including position sensing and/or valve control systems.

The centering apparatus provides an automatic and reliable return of the hopper door to the closed state without regard to or need for sensors or detection of the hopper door position. The centering apparatus also provides a fail-safe mechanism in the event of a failure in the actuation system.

DESCRIPTION OF THE DRAWINGS

Illustrative embodiments are described in detail below with reference to the attached drawing figures, and wherein.

DETAILED DESCRIPTION

Figure 1:
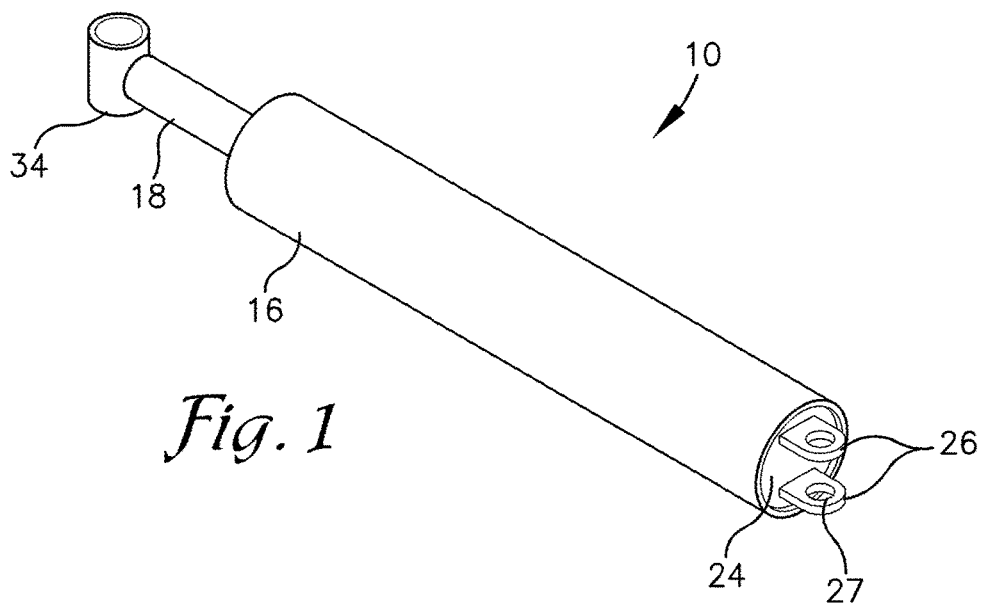
FIG. 1 is a perspective view of a centering apparatus for hopper doors depicted in accordance with an exemplary embodiment.
Figure 2:
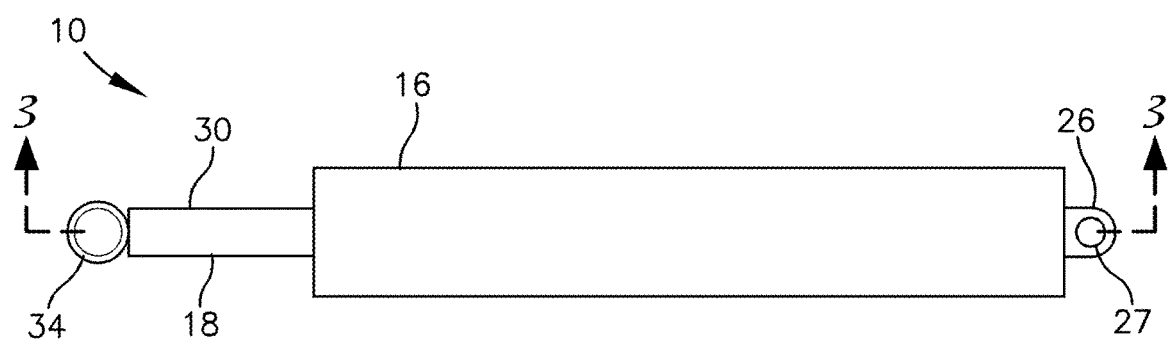
FIG. 2 is side elevational view of the centering apparatus of FIG. 1.
Figure 3:
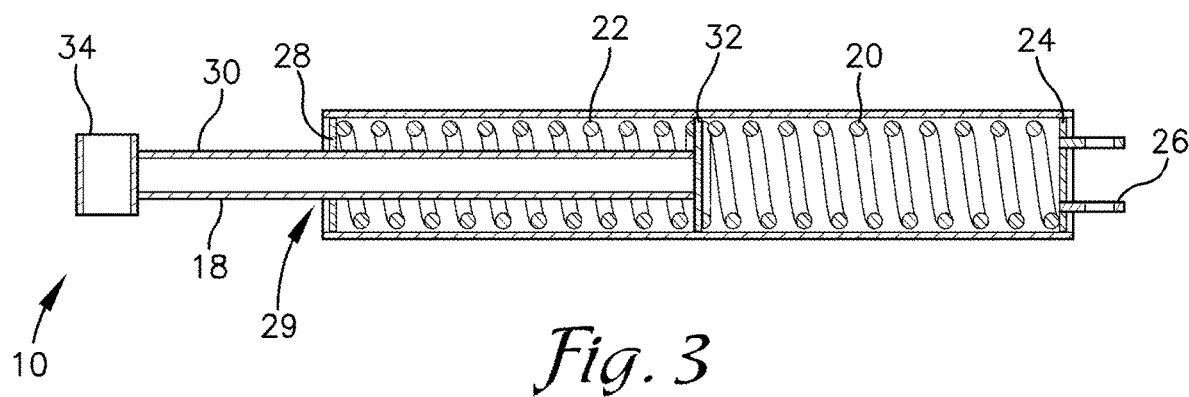
FIG. 3 is a cross-sectional view of the centering apparatus of FIG. 1.

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

With reference to FIGS. 1-10, a centering apparatus 10 for a bi-directionally pivoting hopper door 12 of a hopper car 14 is described in accordance with an exemplary embodiment. The centering apparatus 10 comprises a cylindrical housing 16 in which a piston assembly 18, a proximate spring 20, and a distal spring 22 are disposed.

The cylindrical housing 16 includes an end plate 24 affixed at or near a proximate end thereof. The end plate 24 encloses the proximate end of the housing 16 and provides one or more mounting tabs 26 extending therefrom which are configured to enable coupling of the proximate end of the centering apparatus 10 to a structure of the hopper car 14 as described more fully below. As depicted in FIGS. 1-9, the mounting tabs 26 comprise elongate plates spaced apart along a diameter of the end plate 24 and having aligned apertures 27 configured to couple to the hopper car 14 in a clevis-style fashion. However, it is to be understood that other configurations of the mounting tabs 26 and the coupling with the hopper car 14 may be employed in embodiments without departing from the scope described herein. Preferably, the coupling between the apparatus 10 and the hopper car 14 is at least partially pivotable.

The housing 16 also includes a washer plate 28 affixed at or near an opposite distal end thereof. The washer plate 28 includes a central aperture 29 through which a shaft 30 of the piston assembly 18 is slidably disposed. The washer plate 28 may support the shaft 30 in coaxial alignment with the housing 16 and may include low friction, bearing surfaces or lubricants around the central aperture 29 to aid sliding axial movements of the shaft 30 therethrough.

The piston assembly 18 comprises the shaft 30 which extends through the washer plate 28 and into the housing 16 with a piston head 32 or centerplate coupled to a first end thereof within the housing 16. The piston head 32 extends radially outward from the shaft 30 in close proximity to or into contact with an interior surface of the housing 16. The piston head 32 is configured to move or slide axially along the housing and may include low friction, bearing surfaces or lubricants disposed on a circumferential surface thereof to aid such sliding movements.

An opposite second end of the shaft 30 extends from the distal end of the housing 16 through the washer plate 28 and a coupling collar 34 is mounted thereon. The coupling collar 34 comprises a cylindrical collar configured to receive a crank handle 36 of a hopper door pivot arm or a bell crank 38. The coupling collar 34 may include one or more bearings, bearing surfaces, or lubricants disposed therein to aid rotational motion of the crank handle 36 therein. The crank handle 36 may also be pivotally connected to the bell crank 38 and fixedly secured to the coupling collar 34 or otherwise fixedly coupled to the second end of the shaft 30.

Figure 7:
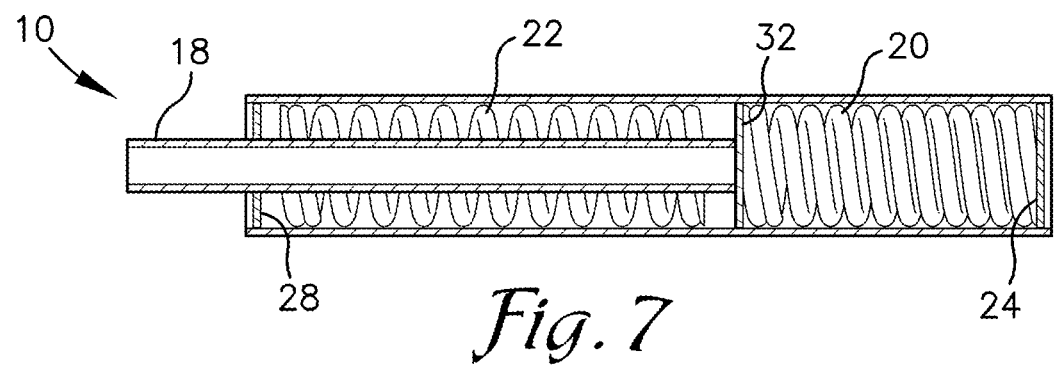
Figure 8:
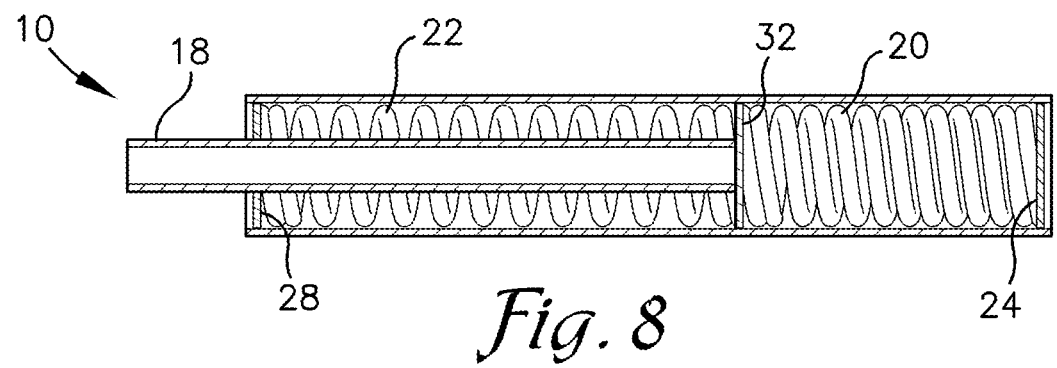
FIGS. 8 and 9 are cross-sectional views of the centering apparatus of FIG. 1 in which one or both ends of coil springs therein are coupled to a center plate and to respective end plates of a housing thereof depicted in accordance with an exemplary embodiment.
Figure 9:
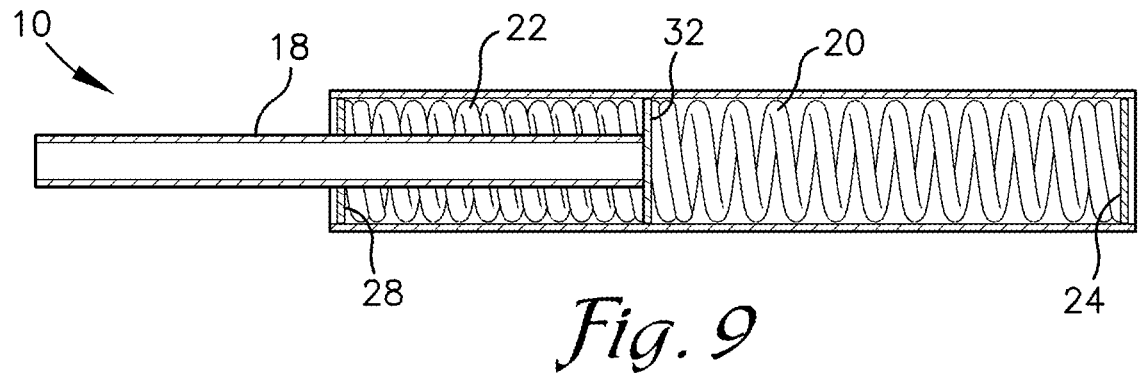
Figure 10:
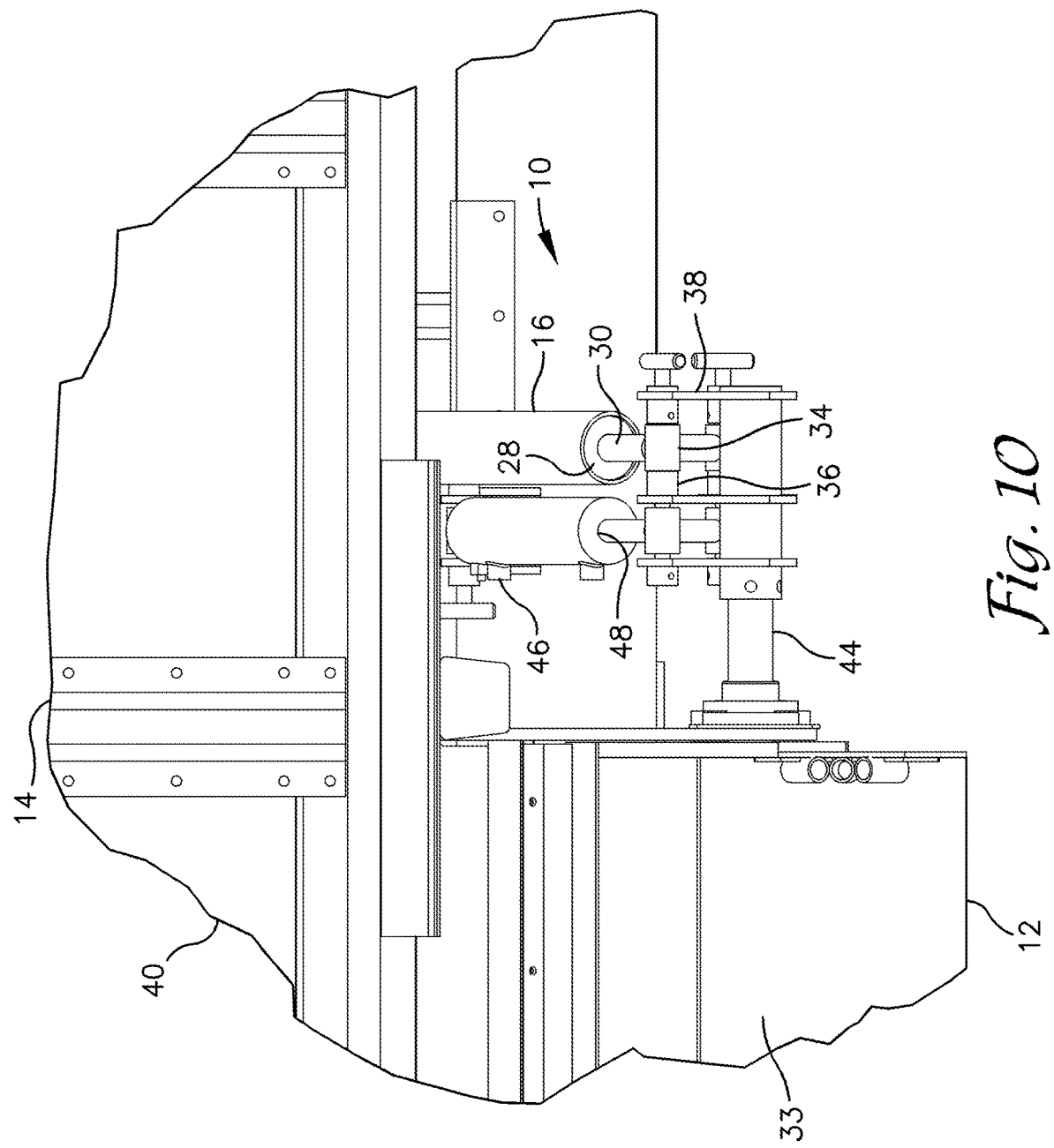
FIG. 10 is an enlarged partial side view of the centering apparatus of FIG. 1 installed on a hopper door in accordance with an exemplary embodiment.
Figure 11:
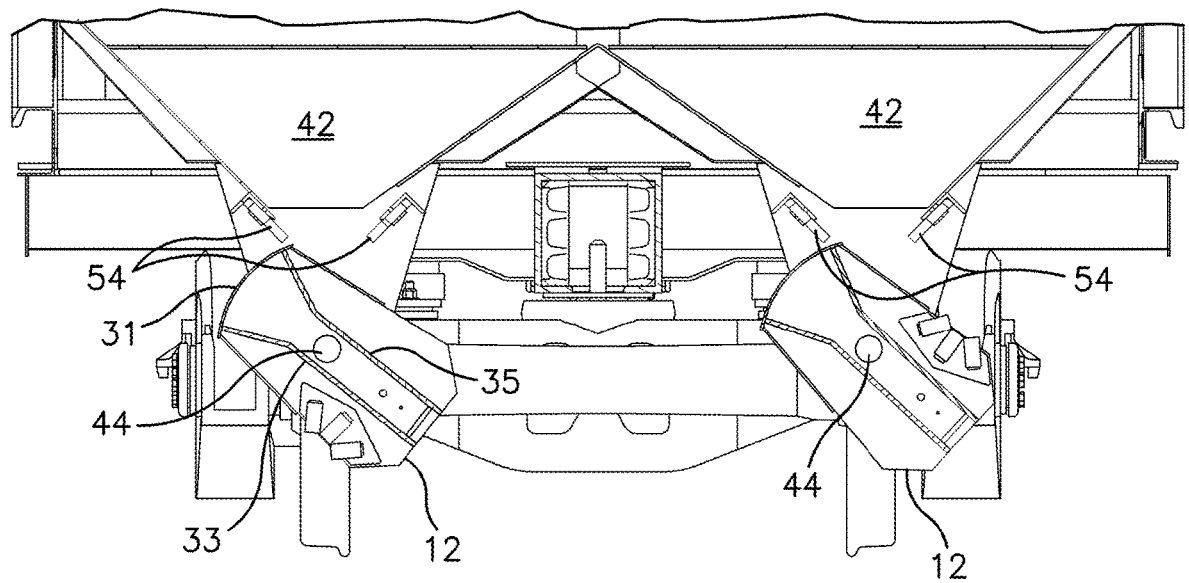
FIG. 11 is a cross-sectional elevational view of hopper doors on a hopper car with the hopper doors in an opened state and with the view taken along a longitudinal length of the hopper doors depicted in accordance with an exemplary embodiment.
Figure 12:
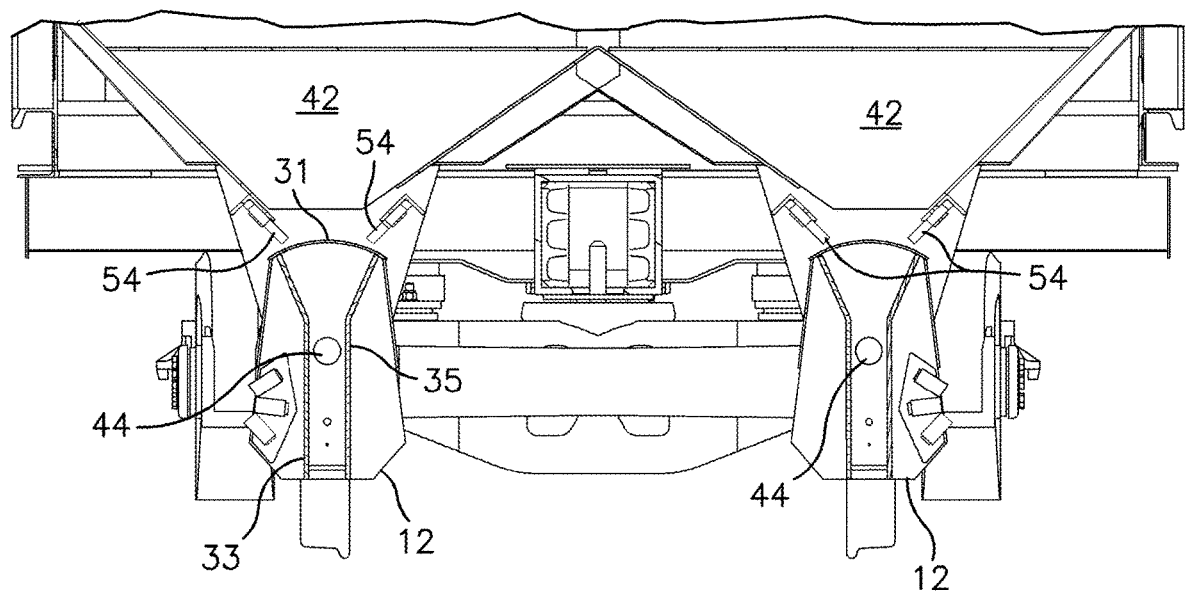
FIG. 12 is a cross-sectional elevational view of the hopper doors of FIG. 11 with the hopper doors depicted in a closed state.
Figure 13:
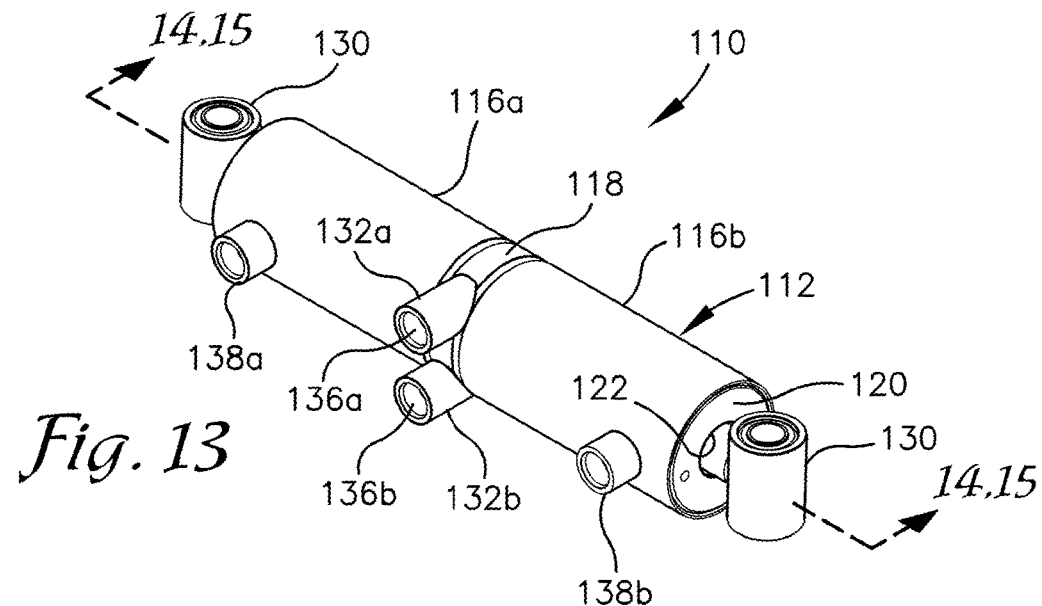
FIG. 13 is a perspective view of a double-acting actuator depicted in accordance with another exemplary embodiment.

The proximate spring 20 and the distal spring 22 are disposed within the housing 16 on opposite sides of the piston head 32. The proximate and distal springs 20, 22 are shown and described herein as coil springs however other spring or similar biasing components may be employed. The proximate spring 20 is positioned between the endplate 24 and the piston head 32 while the distal spring 22 is disposed between the washer plate 28 and the piston head 32 with the shaft 30 of the piston assembly 18 passing axially through the distal spring 22. As depicted in FIGS. 8-9, ends of the proximate spring 20 may be coupled to the endplate 24 and the piston head 32 or one or both ends of the proximate spring 20 may be unattached to the endplate 24 and/or the piston head 32. Similarly, one or both ends of the distal spring 22 may be coupled to one or both of the washer plate 28 and the piston head 32 (FIGS. 8-9) or may be unattached to one or both of the washer plate 28 and the piston head 32 (FIG. 7).

The proximate and distal springs 20, 22 may be at least partially compressed or preloaded to provide counteracting forces on the piston head 32. Alternatively, the proximate and distal springs 20, 22 may be sized to be uncompressed when the piston head 32 is positioned at a home position within the housing 16. The home position is preferably centrally located along the length of the housing 16 however the proximate and distal springs 20, 22 may be configured to provide a non-centralized home position.

Referring now to FIGS. 4, 5, and 10-12 installation and operation of the centering apparatus 10 is described in accordance with an exemplary embodiment. FIGS. 4, 5, and 10-12 depict a hopper car 14 that includes a hopper 40 that divides into a pair of discharge chutes 42 positioned side-by-side along the width of the hopper car 14 and near a bottom portion thereof. Each chute 42 directs material in the hopper 40 toward a respective hopper door 12. The hopper doors 12 comprise bi-directionally pivoting hopper doors with an arcuate closure surface 31, an outboard surface 33, and an inboard surface 35 that can be pivotally opened to direct material in the hopper 40 along the outboard surface 33 toward a respective outboard side of the hopper car 14 or along the inboard surface 35 toward an inboard location beneath the hopper car 14. Each of the hopper doors 12 is pivotably mounted beneath a respective chute 42 on longitudinally extending pivot axles 44. A hopper door bell crank 38 is non-rotatably coupled to each of the pivot axles 44 and extends radially outward therefrom.

An actuation system is provided on the hopper car 14 that includes at least one actuator 46 associated with each hopper door 12. The actuators 46 preferably comprise hydraulic actuators but may also employ pneumatic or electronic actuators, among other technologies. Each actuator 46 is coupled between a fixed structure of the hopper car 14 and a distal end of a respective hopper door bell crank 38. A distal end of a piston 48 of each of the actuators 46 is coupled to the crank handle 36 of each respective hopper door 12 such that actuation of the actuator 46 operates to pivot the hopper door 12.

At least one centering apparatus 10 is provided for each hopper door 12 and is coupled between the hopper car 14 and the respective hopper door bell crank 38. To couple the apparatus 10 to the hopper car 14 the mounting tabs 26 are coupled to a rigid mounting flange 50 on the hopper car 14. The mounting flange 50 is inserted between the mounting tabs 26 and a pin 52 is installed through the apertures 27 in the mounting tabs 26 and through an aperture in the mounting flange 50 in a clevis-style coupling that enables at least partial pivotal movement of the apparatus 10 relative to the mounting flange 50.

The coupling collar 34 of each centering apparatus 10 is coupled to the crank handle 36 of the respective hopper door 12. The centering apparatus 10 and the respective actuator 46 may be mounted side-by-side and coupled to the same crank handle 36 or additional crank handles 36 may be provided on the hopper door bell crank 38 to accommodate the centering apparatus 10.

Figure 4:
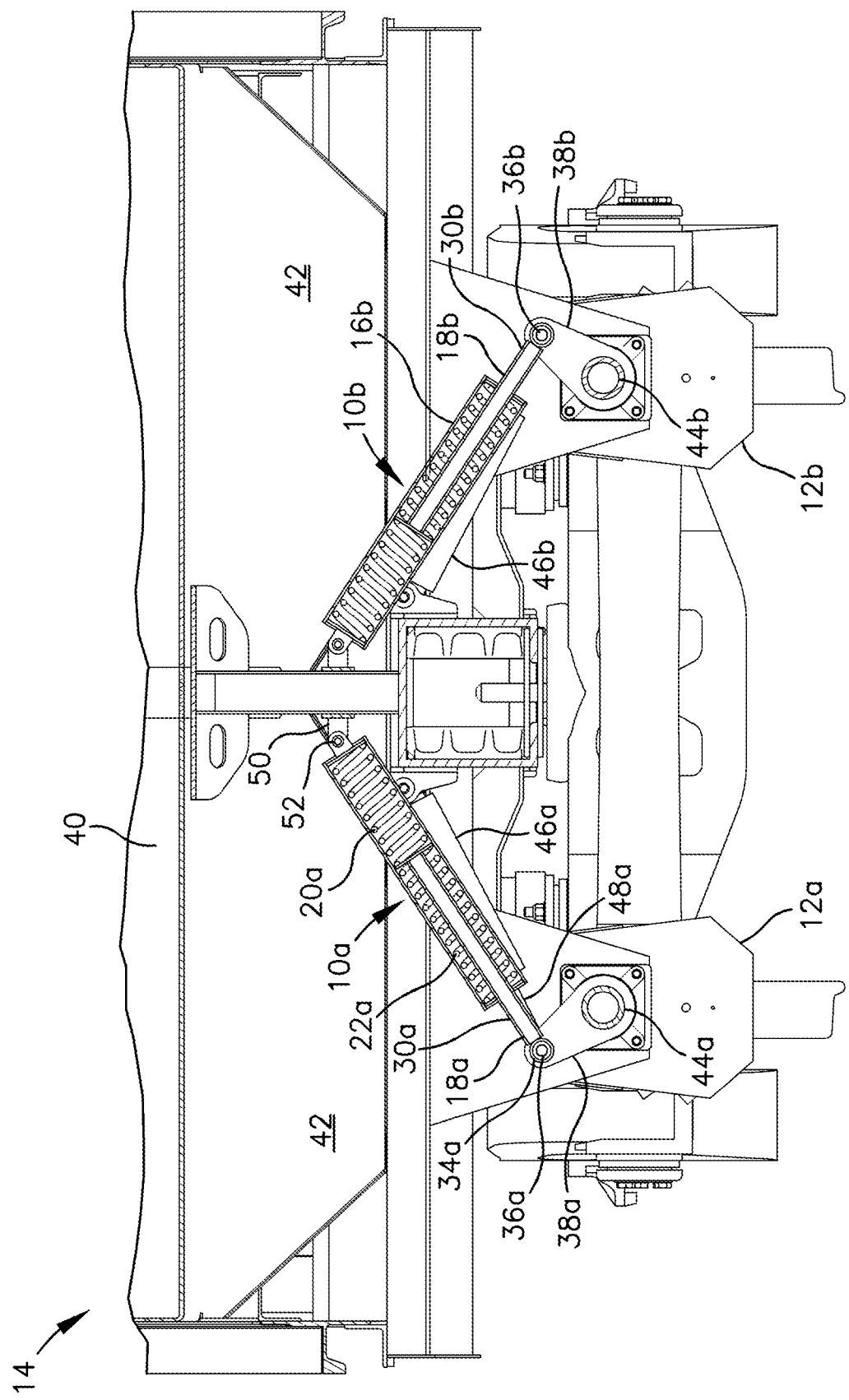
FIG. 4 is a cross-sectional view of a hopper car with two of the centering apparatuses of FIG. 1 installed thereon and with two hopper doors in a closed position depicted in accordance with an exemplary embodiment.
Figure 5:
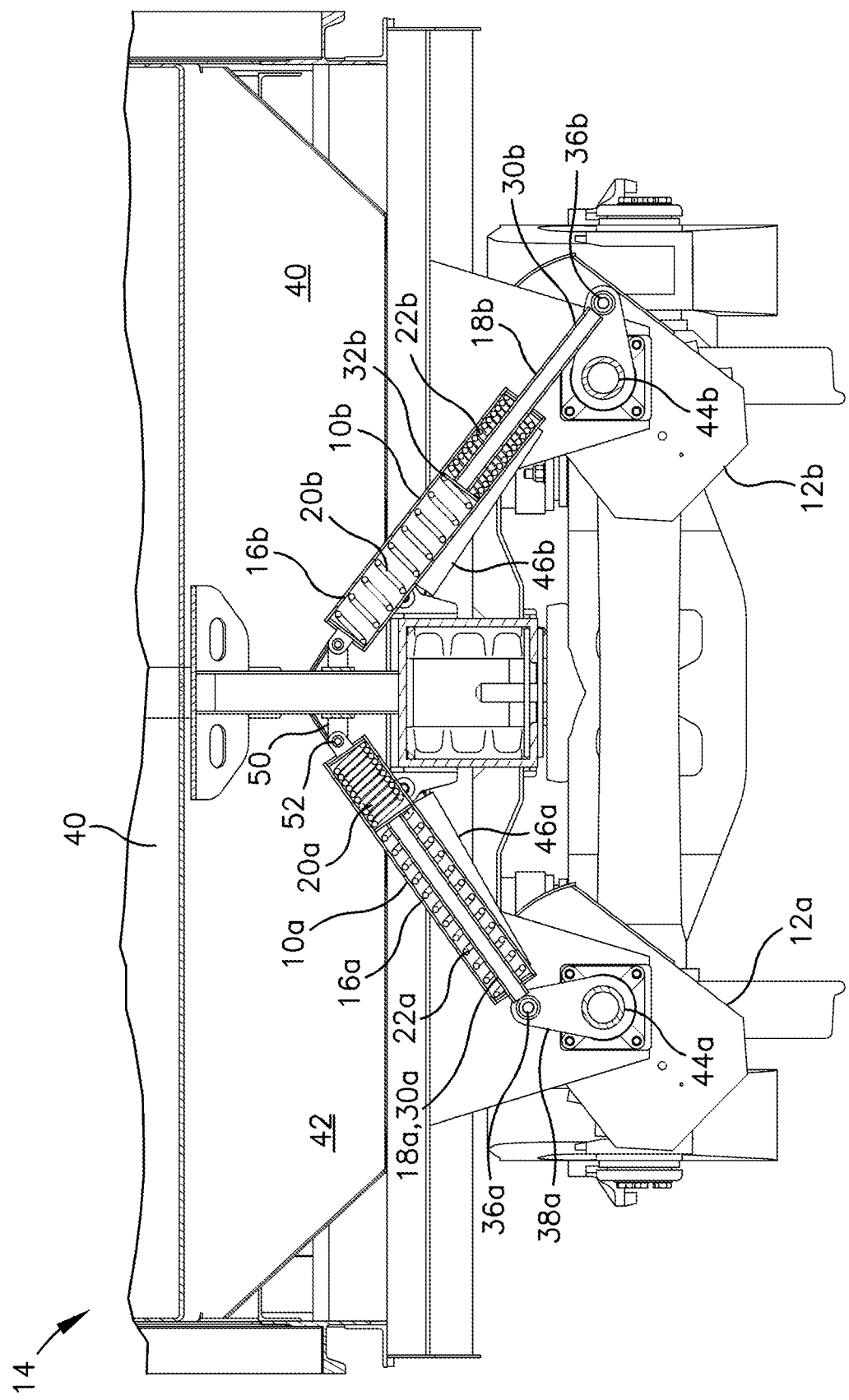
FIG. 5 is a cross-sectional view of the hopper car of FIG. 4 with the hopper doors pivoted to an open state, a left-side hopper door open to dump outside the rails and a right-side hopper door open to dumb between the rails, depicted in accordance with an exemplary embodiment.
Figure 6:
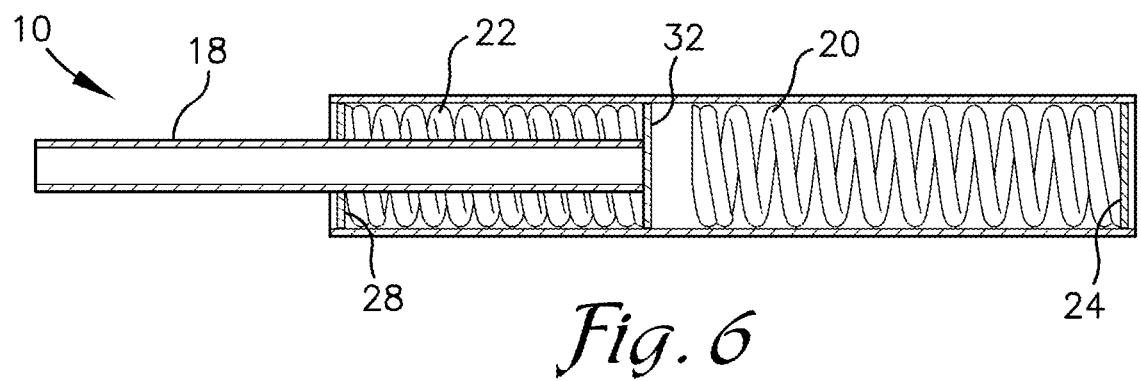
FIGS. 6 and 7 are cross-sectional views of the centering apparatus of FIG. 1 in which one or both ends of coil springs therein are not coupled to structures within a housing thereof depicted in accordance with an exemplary embodiment.

As depicted in FIG. 4, when the hopper doors 12 are in a closed state the centering apparatus 10 are at rest, i.e. the piston head 32 is at a home position and the forces provided by the proximate and distal springs 20, 22 are substantially equal. In the home position, the piston head 32 is preferably positioned at a central location along the length of the housing 16, but other configurations may be employed. With reference to FIG. 5, when the actuators 46 are energized, the hopper doors 12 are pivoted transversely either outboard or inboard and the centering apparatus 10 are moved away from the home position to compress one of the proximate or distal springs 20, 22 as described below.

With respect to the hopper door 12a located on the left side of the hopper car 14 as depicted in FIGS. 4 and 5, the hopper door 12a is pivoted outboard or to discharge material in the hopper 40 to the outboard side of the hopper car 14 when the actuator 46a is retracted. Such pivoting is provided by the actuator 46a retracting to rotate the hopper door bell crank 38a clockwise about the axle 44a. This clockwise rotation moves the piston assembly 18a into the cylindrical housing 16a and compresses the proximate spring 20a between the piston head 32a and the endplate 24a. As such, the compressed proximate spring 20a provides a force against the piston head 32a which urges the piston head 32a to return to the home position. The forces applied by the proximate and/or distal springs 20, 22 are sufficient to pivot the hopper door 12 to the closed state when the actuator 46 is de-energized but are not sufficient to overcome forces applied by the actuator 46 on the hopper door 12 when energized.

In embodiments in which the distal spring 22a is coupled to the washer plate 28 and to the piston head 32a as depicted in FIG. 5, the distal spring 22a is also stretched or elongated by movement of the piston assembly 18a into the housing 16a. The elongated or stretched distal spring 22a also provides a force on the piston head 32a urging the piston head 32a toward the home position. In embodiments in which the ends of the distal spring 22 and/or the proximate spring 20 are not coupled to the respective endplate 24, piston head 32, or washer plate 28, the distal and/or proximate springs 22, 20 may be allowed to freely move axially within the housing 16 when not in a compressed state as depicted by the distal spring 22 in FIG. 7. Or one end of one or both of the proximate and distal springs 20, 22 may be coupled to a respective one of the endplate 24, piston head 32, or washer plate 28 to prevent axial movement of the proximate and/or distal springs 20, 22 within the housing 16 as depicted by the proximate spring 20 in FIG. 6.

Although not shown, the opposite operation of actuator system provides extension of the actuator 46a which operates to rotate the hopper door bell crank 38a counterclockwise and pivots the hopper door 12a inboard for discharging material beneath the hopper car 14. This counterclockwise rotation also draws the piston assembly 18a outward from the housing 16a thereby compressing the distal spring 22a and elongating or stretching the proximate spring 20a. The proximate and distal springs 20a, 22a thus provide forces on the piston head 32*a* in the opposite direction of that described above and urge or bias the hopper door 12 in the opposite direction toward the closed state.

Referring now to the hopper door 12*b* depicted on the right side of the hopper car 14*b* in FIGS. 4 and 5, operations of the actuator 46*b* to pivot the hopper door 12*b* and of the centering apparatus 10*b* to return the hopper door 12*b* to the closed state are reversed. Extension of the actuator 46*b* operates to pivot the hopper door 12*b* inboard while retraction of the actuator 46*b* pivots the hopper door 12*b* outboard. Similarly, pivoting of the hopper door 12*b* inboard extends the piston assembly 18*b* from the housing 16*b* and compresses the distal spring 22*b* while pivoting the hopper door 12*b* outboard retracts the piston assembly 18*b* into the housing 16*b* and compresses the proximate spring 20*b*.

Accordingly, the centering apparatus 10 provides an automatic, self-centering mechanism that returns the hopper door 12 to the closed state when the actuator 46 is de-energized purposefully or due to a fault in the system. The apparatus 10 also operates to return the hopper door 12 to the closed state from either an outboard position or an inboard position and does not rely on sensors, such as proximity sensors 54, or other detection mechanisms for operation.

With reference now to FIGS. 13-18, a centering apparatus 110 is described in accordance with another embodiment. The centering apparatus 110, like the centering apparatus 10 operates to return the hopper door 12 to the closed state upon occurrence of a fault within the system and/or without need for detection or positional confirmation via sensors, such as the proximity sensors 54. The centering apparatus 110 may be employed alongside or instead of the centering apparatus 10.

The centering apparatus 110 comprises a double-acting actuator 112. The double-acting actuator 112 includes an elongate cylindrical housing 114 formed from a pair of open-ended, hollow, cylindrical sections 116 positioned end to end and joined at or near the longitudinal midpoint of the housing 114 by a midplate 118. Opposite, distal ends of the sections 116 include washer plates 120 coupled across their open distal ends and enclosing the respective ends but for a centrally located opening 122 formed by the washer plate 120.

A piston assembly 124 is disposed within each cylindrical section 116. The piston assemblies 124 each include a piston head 126, a piston rod 128, and a coupling collar 130. The piston head 126 is coupled to a first end of the piston rod 128 within the cylindrical section 116 and between the midplate 118 and the washer plate 120. The piston rod 128 extends from the piston head 126 and through the washer plate 120 to an opposite second end outside the cylindrical section 116 where the coupling collar 130 is coupled thereto. The piston assembly 124 is thus moveable along the length of the cylindrical section 116 to extend or retract the piston rod 128, and thus the coupling collar 130, relative to the distal end of the cylindrical section 116. Such movements are produced via forces applied by a motive fluid, such as a hydraulic fluid, an oil, a gas, or another available fluid on the piston head 126, in a manner like that of known actuators. One or more seals may be provided between the washer plate 120 and the piston rod 128 and/or between the piston head 126 and an interior surface of the cylindrical section 116 to retain the motive fluid within the cylindrical section 116.

The coupling collars 130 are configured similarly to the coupling collar 34 described above. The coupling collars 130 are configured to pivotably or rotatably couple the centering apparatus 110 between the mounting flange 50 on the frame of the hopper car 14 and the crank handle 36 of the hopper door bell crank 38. It is understood that other mounting configurations might be used in exemplary embodiments without departing from the scope described herein. For example, the coupling collar 130 might couple directly to the hopper door 12 rather than to the bell crank 38 or other lever arm associated with the hopper door 12.

The midplate 118 includes a pair of proximate fluid couplers 132 extending from a circumferential surface thereof. Each of the proximate fluid couplers 132 is configured to couple to hoses or similar components of an actuation system 134. The actuation system 134 is shown and described herein as a hydraulic actuation system, e.g. a system that employs hydraulic fluids as the motive fluid, however other systems may be employed, such as for example pneumatic systems. Each of the proximate fluid couplers 132 includes a bore 136 that extends coaxially through the proximate fluid coupler 132 and then turns to extend generally longitudinally along the length of the housing 114 and into the interior of a respective one of the cylindrical sections 116. As such, hydraulic fluid flowing through the bore 136*a* of a first of the proximate fluid couplers 132*a* passes into a cavity within a first of the cylindrical sections 116*a* while fluid flowing through the bore 136*b* of a second of the proximate fluid couplers 132*b* passes into a cavity of the second of the cylindrical sections 116*b*. Components of the centering apparatus 110 are referred to herein interchangeably with and without "a" and "b" designations where necessary to aid clarity and the reader's understanding; the "a" and "b" designations are not otherwise intended to identify differences between the components referred to.

A distal fluid coupler 138 is provided along the length of each of the cylindrical sections 116 near the distal end thereof and to an opposite side of the piston head 126 from the respective proximate coupler 132. The distal fluid coupler 138 thus enables flow of the hydraulic or other motive fluid in/out of a cavity between the piston head 126 and the washer plate 120 of the respective cylindrical section 116. The distal fluid couplers 138, like the proximate fluid couplers 132, are configured to couple to hoses or similar connections of the actuation system 134.

Figure 16:
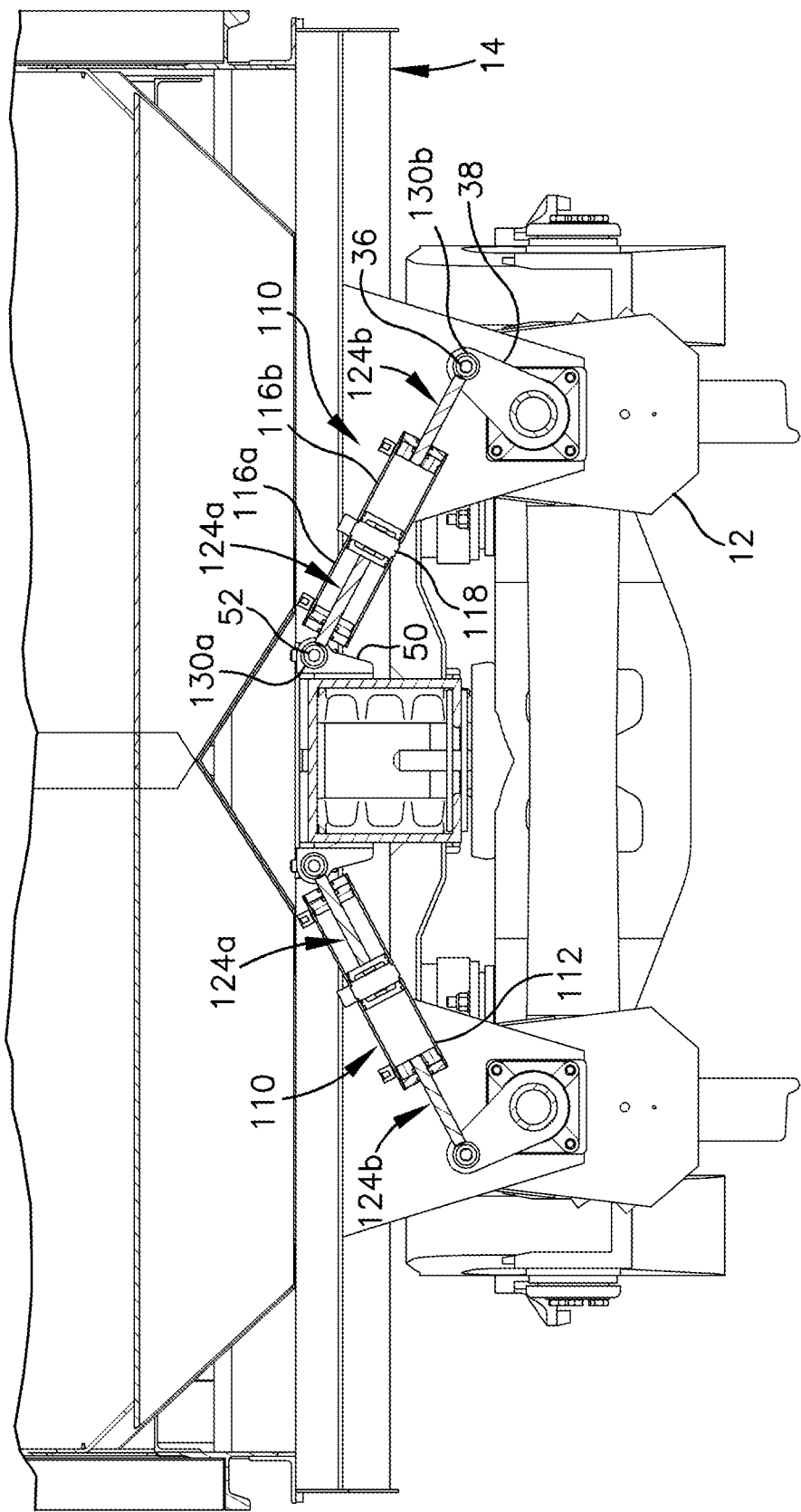
FIG. 16 is a cross-sectional elevational view of a pair of the double-acting actuators of FIG. 13 mounted on hopper doors of a hopper car and with the hopper doors in a closed position.
Figure 17:
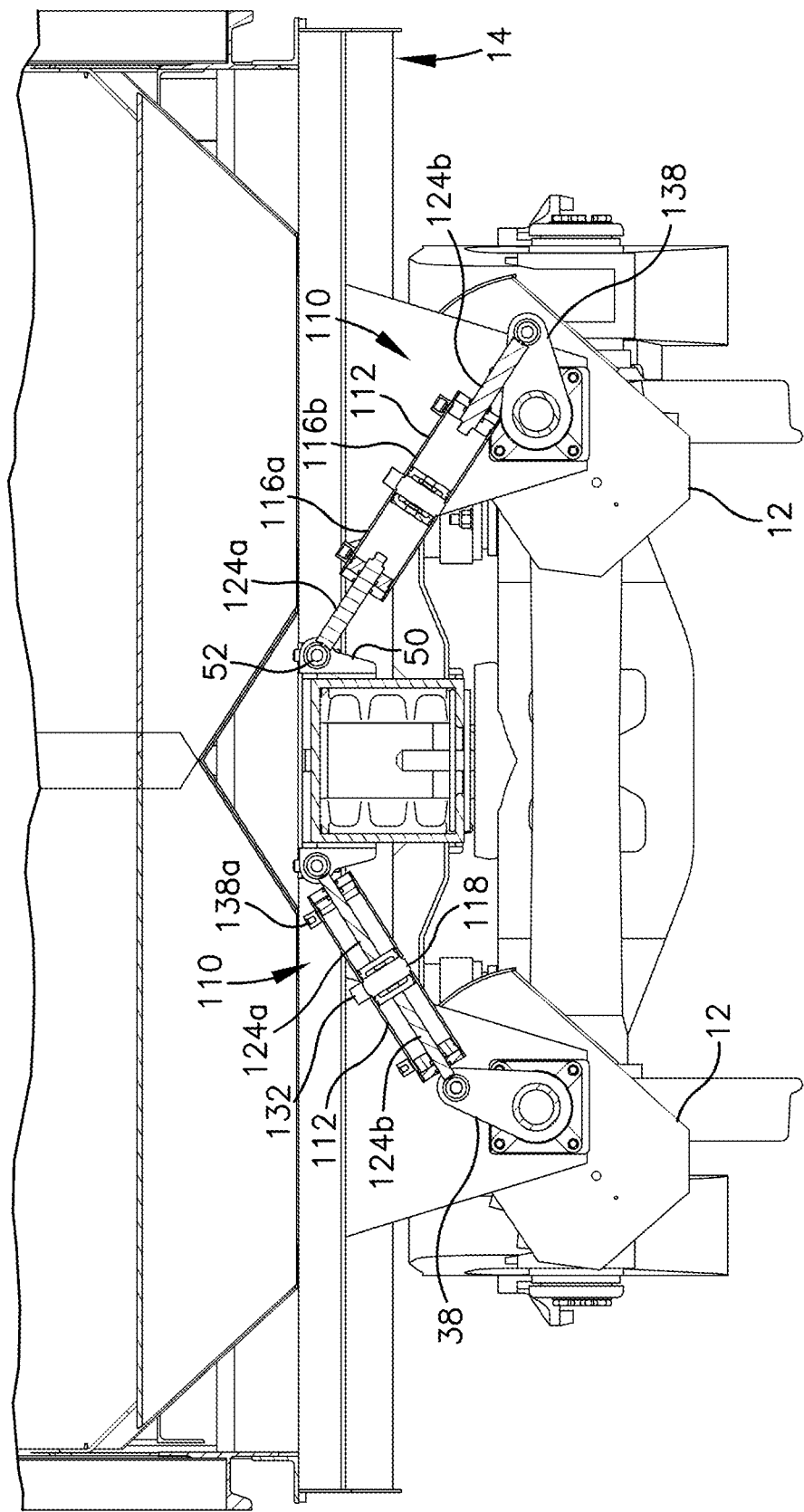
FIG. 17 is a cross-sectional elevational view of a pair of the double-acting actuators of FIG. 13 mounted on a hopper doors of a hopper car and with a left-side hopper door pivoted to dump outside of rails on which the hopper car is disposed and a right-side hopper door pivoted to dump between the rails.

With continued reference to FIGS. 13-17, operation of the centering apparatus 110 is described in accordance with an exemplary embodiment. As depicted in FIGS. 16 and 17, the centering apparatus 110 is disposed to extend between the mounting flange 50 on the hopper car 14 and the hopper door bell crank 38 on the hopper door 12. A first coupling collar 130*a* of the centering apparatus 110 pivotably or rotatably couples to the mounting flange 50 on the hopper car 12 via the pin 52 extending therethrough. The opposite second coupling collar 130*b* of the centering apparatus 110 pivotably or rotatably couples to the crank handle 36 of the hopper door bell crank 38.

As depicted in FIG. 16, the hopper doors 12 are in the closed state and the piston assemblies 124 of the centering apparatus 110 are positioned in a normal or default state. In the normal state, the piston assembly 124*a* is in a fully retracted state such that the piston head 126*a* is at its closest proximity to or abutting the midplate 118, and the second piston assembly 124*b* is in a fully extended state in which the piston head 126*b* is at its furthest extent from the midplate 118 and in close proximity to or abutting the washer plate 120*b*.

Movement of the hopper door 12 to the inboard or outboard open positions is performed by retracting the second piston assembly 124*b* as depicted on the left-side hopper door 12 in FIG. 17 or by extending the first piston assembly 124a as depicted on the right-side hopper door 12 in FIG. 17. In the configuration shown in FIGS. 16 and 17, the hopper doors 12 are pivoted inboard to dump material between the rails when both piston assemblies 124 of the centering apparatus 110 are extended and are pivoted outboard to dump material outside the rails when both piston assemblies 124 are retracted. However, it is understood that other configurations may be employed without departing from the scope of embodiments described herein.

Preferably, movement of the piston assemblies 124 is conducted to move the assemblies 124 between the fully retracted and fully extended states and not incrementally between such states however, such incremental movements may be employed. Interaction between the piston assemblies 124 and the midplate 118 or washer plates 120 when fully retracted/extended provides hard stops or known overall lengths of the double-acting actuator 112 and thus known positioning of the associated hopper door 12 without need for sensors or other apparatus to determine positioning of the hopper door 12. For example, as discussed previously, when one piston assembly 124a is fully retracted and the other piston assembly 124b is fully extended the hopper door 12 is known to be in the closed position; when both piston assemblies 124 are fully retracted the hopper door 12 is known to be pivoted for outboard dumping; and when both piston assemblies 124 are fully extended the hopper door 12 is known to be pivoted for inboard dumping.

Figure 18:
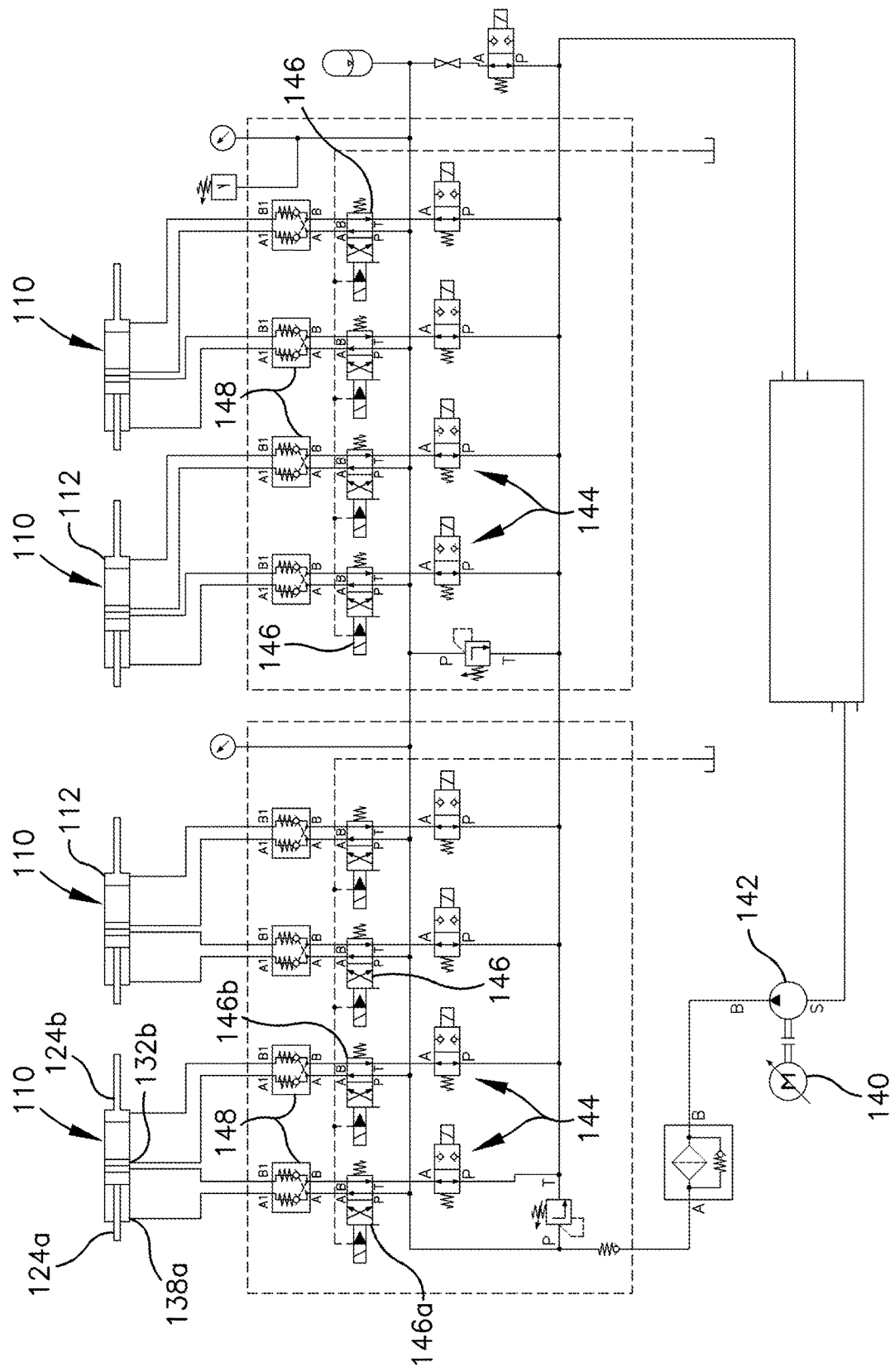
FIG. 18 is a schematic diagram of a hydraulic system configured to control double-acting actuators for dumping from a hopper car depicted in accordance with an exemplary embodiment.

With additional reference to FIG. 18, the exemplary actuation system 134 is described. FIG. 18 depicts the actuation system 134 disposed on hopper car 14 having four hopper doors 12 and thus including four double-acting actuators 112 and associated components however it is understood that embodiments of the invention are not so limited. The actuation system 134 includes the double-acting actuators 112, a motor 140 and pump 142, blocking valves 144, operational valves 146, and pilot operational check valves 148. Other components, such as check valves, gages, tanks, and the like may be employed in the system 134. Such components are employed in known fashions and are thus not described in detail herein. As known in the art, the motor 140 drives the pump 142 to apply hydraulic pressure within the system 134.

Two operational valves 146 are provided for each double-acting actuator 112—one for each piston assembly 124. The operational valves 146 are configured to continuously pass hydraulic pressure to an "A" line connected a respective half or side of the double-acting actuator 112 while in a normal or non-energized state. When actuated or energized the operational valves 146 reverse the hydraulic flow and provide pressure to a "B" line connected to the same half or side of the double-acting actuator 112.

Figure 14:
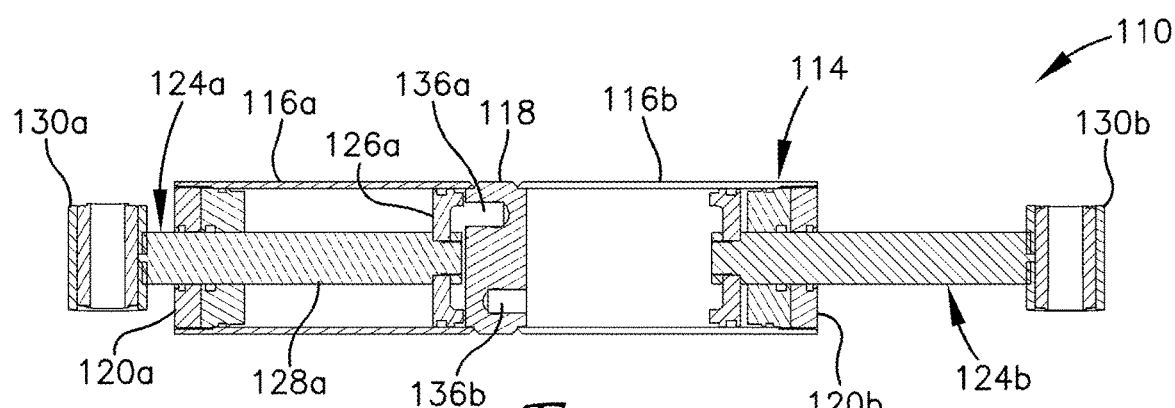
FIGS. 14 and 15 are cross-sectional views of the double-acting actuator of FIG. 13 depicting pistons therein in different extended states.
Figure 15:
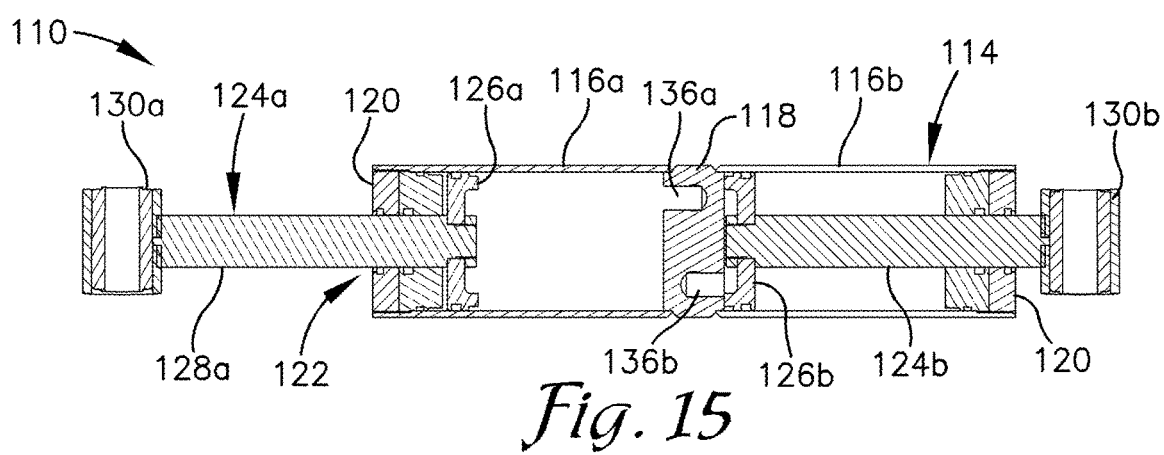

As depicted in FIG. 18 and shown in FIG. 14, one of the operational valves 146a for each double-acting actuator 112 is plumbed such that the normally pressurized A line is coupled to the distal fluid coupler 138a to retract the piston assembly 124a when the operational valve 146a is in the normal or non-energized state. The second of the operational valves 146b is plumbed such that the A line is coupled to the proximate fluid coupler 132b to extend the piston assembly 124b when the valve is in the normal or non-energized state. As such, the centering apparatus 110 includes one retracted piston assembly 124a and one extended piston assembly 124b which places the hopper door 12 in the closed position when the operational valves 146a,b are in the normal or non-energized state.

With this configuration, the hopper doors 12 may always be placed in the closed position unless the operational valves 146 are energized. As such, if a power failure occurs, the operational valves 146 are automatically de-energized and automatically return the flow of hydraulic pressure to the A line which in turn moves the hopper doors 12 to the closed position as long as there is a minimum level of hydraulic pressure within the system 134.

Additionally, as described previously the piston assemblies 124 provide hard stops or maximum extents of travel that are defined by the distance between the midplate 118 and the washer plate 120 which further defines the extent of pivotal movements of the hopper door 12. As such, the operational valves 146 may be simply operated to toggle between providing hydraulic flow to either the A line or the B line to selectively move each of the piston assemblies 124 to their fully extended or fully retracted states and thus reliably achieve the inboard, outboard, and closed positions of the hopper door 12 without need for sensing or tracking positions of the hopper door 12 or of the piston assemblies 124.

With continued reference to FIG. 18, the blocking valves 144 can be energized to block return flow of hydraulic flow to enable manual operation or pivoting of the hopper doors 12. The pilot operational check valves 148 are configured to provide a fail-safe that ensures at least a minimum hydraulic pressure is present before the operational valves 146 can operate to move the piston assemblies 124; in the event of a loss of hydraulic pressure the pilot operational check valves 148 may prevent unwanted movement of the hopper doors 12.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A centering apparatus for a pivotable hopper door of a hopper car, the apparatus comprising:
    an elongate housing;
    a first piston assembly having a first piston head disposed within the housing, a first piston rod extending from a first end of the housing, and a first coupler disposed at a distal end of the first piston rod and configured to operatively couple to one of a frame of a hopper car and a hopper door;
    a second piston assembly having a second piston head disposed within the housing, a second piston rod extending from an opposite second end of the housing, and a second coupler disposed at a distal end of the second piston rod, the second coupler configured to operatively couple to the other of the frame of the hopper car and the hopper door; and a midplate positioned along a length of the housing between the first piston assembly and the second piston assembly;

a biasing apparatus that biases the first piston assembly toward a normal state in which the hopper door is in a closed state and material flow from a hopper in the hopper car is blocked by the hopper door.

2. The apparatus of claim 1, wherein the midplate includes a first fluid coupling through which a fluid is communicated into a first cavity between the midplate and the first piston head, and a second fluid coupling through which the fluid is communicated into a second cavity between the midplate and the second piston head.

3. The apparatus of claim 2, further comprising:
an actuation system that includes
a source of hydraulic pressure,
a first valve configured to provide fluid communication between the source of hydraulic pressure and the first cavity to extend the first piston rod from the housing when the first valve is in a non-energized state, and a second valve configured to provide fluid communication between the source of hydraulic pressure and a third cavity that is between the second piston head and the second end of the housing to retract the second piston rod into the housing when the second valve is in the non-energized state.

4. The apparatus of claim 1, wherein the first piston rod is extended from the housing and the second piston rod is retracted into the housing when the hopper door is in the closed state.

5. The apparatus of claim 1, wherein both the first piston rod and the second piston rod are extended from the housing to pivot the hopper door in a first direction and both the first piston rod and the second piston rod are retracted into the housing to pivot the hopper door in an opposite second direction.

6. A centering apparatus for a pivotable hopper door of a hopper car, the apparatus comprising:
an elongate housing;
a first piston assembly having a first piston head disposed within the housing, a first piston rod extending from a first end of the housing, and a first coupler disposed at a distal end of the first piston rod and configured to operatively couple to one of a frame of a hopper car and a hopper door;

a second piston assembly having a second piston head disposed within the housing, a second piston rod extending from an opposite second end of the housing, and a second coupler disposed at a distal end of the second piston rod and operatively configured to couple to the other of the frame of the hopper car and the hopper door;

a midplate positioned along a length of the housing between the first piston assembly and the second piston assembly; and a biasing apparatus configured to move the first piston assembly and the second piston assembly to place the hopper door in a closed state in which material flow from a hopper in the hopper car is blocked.

7. The apparatus of claim 6, wherein the midplate includes a first fluid coupling through which a fluid is communicated into a first cavity between the midplate and the first piston head, and a second fluid coupling through which the fluid is communicated into a second cavity between the midplate and the second piston head.

8. The apparatus of claim 7, wherein the biasing apparatus further comprising:
an actuation system that includes
a source of hydraulic pressure,
a first valve configured to provide fluid communication between the source of hydraulic pressure and the first cavity to extend the first piston rod from the housing when in a non-energized state, and
a second valve configured to provide fluid communication between the source of hydraulic pressure and a third cavity that is between the second piston head and the second end of the housing to retract the second piston rod into the housing when in the non-energized state.

9. The apparatus of claim 6, wherein the first piston rod is extended from the housing and the second piston rod is retracted into the housing when the hopper door is in the closed state.

10. The apparatus of claim 6, wherein both the first piston rod and the second piston rod are extended from the housing to pivot the hopper door in a first direction and both the first piston rod and the second piston rod are retracted into the housing to pivot the hopper door in an opposite second direction.

* * * * *